United States Patent
Hessbrueggen

(10) Patent No.: US 9,358,653 B2
(45) Date of Patent: Jun. 7, 2016

(54) DOUBLE-SPINDLE MACHINING APPARATUS

(71) Applicant: Norbert Hessbrueggen, Salach (DE)

(72) Inventor: Norbert Hessbrueggen, Salach (DE)

(73) Assignee: EMAG HOLDING GMBH, Salach (DE)

( * ) Notice: Subject to any disclaimer, the term of this patent is extended or adjusted under 35 U.S.C. 154(b) by 201 days.

(21) Appl. No.: 14/252,089

(22) Filed: Apr. 14, 2014

(65) Prior Publication Data

US 2014/0326114 A1 Nov. 6, 2014

(30) Foreign Application Priority Data

Apr. 16, 2013 (DE) .......................... 10 2013 006 522

(51) Int. Cl.

| | |
|---|---|
| *B23B 29/24* | (2006.01) |
| *B23Q 39/02* | (2006.01) |
| *B23B 9/00* | (2006.01) |
| *B23Q 7/04* | (2006.01) |
| *B23B 3/10* | (2006.01) |
| *B23Q 39/00* | (2006.01) |

(52) U.S. Cl.
CPC ................ *B23Q 39/02* (2013.01); *B23B 9/005* (2013.01); *B23Q 7/047* (2013.01); *B23Q 39/028* (2013.01); *B23B 3/10* (2013.01); *B23B 2270/14* (2013.01); *B23Q 2039/008* (2013.01); *Y10T 82/2508* (2015.01); *Y10T 82/2511* (2015.01); *Y10T 82/2524* (2015.01)

(58) Field of Classification Search
CPC ............ Y10T 82/2508; Y10T 82/2511; Y10T 82/2514; Y10T 82/2516; Y10T 82/2524; B23Q 1/01; B23Q 1/017; B23Q 1/012; B23Q 1/015; B23Q 1/45; B23Q 1/621; B23Q 39/048; B23Q 39/024; B23Q 2039/008; B23Q 2039/002; B23Q 2039/006; B23Q 7/04; B23Q 7/046; B23Q 7/047; B23Q 7/00; B23Q 7/623; B23Q 39/02; B23Q 39/028; B23B 3/10; B23B 3/16; B23B 3/06; B23B 13/04; B23B 13/02; B23B 13/10; B23B 2270/14

USPC ............ 82/122, 121, 129, 124, 125; 29/27 R, 29/27 C

See application file for complete search history.

(56) References Cited

U.S. PATENT DOCUMENTS

| | | | | |
|---|---|---|---|---|
| 3,792,633 | A * | 2/1974 | Filipiev ................. | B23Q 39/04 29/38 A |
| 5,688,084 | A * | 11/1997 | Fritz ....................... | B23Q 1/03 310/13 |
| 5,699,598 | A | 12/1997 | Hessbrueggen | |
| 8,661,950 | B2 | 3/2014 | Hessbrueggen | |
| 2012/0048075 | A1* | 3/2012 | Hessbrueggen ......... | B23B 3/30 82/121 |
| 2012/0125165 | A1* | 5/2012 | Hessbrueggen ....... | B23Q 7/047 82/1.11 |
| 2013/0133488 | A1* | 5/2013 | Schuster .................. | B23B 3/30 82/121 |
| 2013/0206438 | A1* | 8/2013 | Hessbrueggen ..... | B23Q 1/4876 173/39 |

FOREIGN PATENT DOCUMENTS

FR 2715336 A1 * 7/1995 ............ B23Q 1/012

* cited by examiner

*Primary Examiner* — Daniel Howell
*Assistant Examiner* — Nicole N Ramos
(74) *Attorney, Agent, or Firm* — Andrew Wilford

(57) ABSTRACT

An apparatus for machining a workpiece has a housing having a vertical front wall and a first vertical side wall generally perpendicular thereto, respective first front and side vertical guides on the front and first side walls, and a first vertical slide extending along the front and first side walls. First front and side formations on the first vertical slide engage the first front and side guides for vertical movement of the first vertical slide relative to the housing. A first spindle unit adapted to hold the workpiece is carried on the first vertical slide, and a tool holder adapted to hold tools in a first work station is provided below the first vertical slide so that the spindle unit can engage the workpiece with a one of the tools in the work station.

11 Claims, 3 Drawing Sheets

DOUBLE-SPINDLE MACHINING APPARATUS

FIELD OF THE INVENTION

The present invention relates to a double-spindle machining apparatus. More particularly this invention concerns a double-spindle machining apparatus.

BACKGROUND OF THE INVENTION

A double-spindle machining apparatus is known from U.S. Pat. No. 8,661,950 having a frame defining a first transfer station and a first machining station thereabove, a first spindle having a workpiece grab and vertically displaceable on the frame between an upper position with the grab in the machining station and a lower position with the grab in the transfer station, a tool holder horizontally displaceable on the frame toward and away from the machining station, and a workpiece conveyor extending through the transfer station. After shifting a deflector underneath the machining station into a side position out from underneath the grab, the grab is lowered to pick an at least partially unmachined workpiece in the transfer station off the conveyor and then raised with the workpiece into the machining station. The deflector is then shifted into a use position over the transfer station and under the machining station, and a tool held in the tool holder is engaged with the workpiece in the machining station and machining the workpiece such that chips fall from the workpiece while maintaining the deflector in the use position and deflecting the falling chips with the deflector away from the transfer station. Then the machining of the workpiece is stopped and the deflector is shifted into the side position and the grab is lowered with the machined workpiece onto the conveyor in the transfer station. Finally, the machined workpiece is transported out of the transfer station and a fresh at least partially unmachined workpiece is moved into the transfer station.

Thus the loading and unloading or transfer station is located directly underneath the machining station so that the workpiece spindle can deposit and pick up a completely finished workpiece and pick up an unfinished workpiece on the conveyor by solely moving vertically. Even though the workpiece spindle can only be moved vertically, no additional loading and unloading device is needed. With this method, a two-spindle machine tool can be operated particularly advantageously, and the tool holder or turret can be moved exclusively horizontally back and forth between the two workpiece spindles. This double-spindle machine requires only three controlled axes.

Another machining apparatus is known from U.S. Pat. No. 5,699,598 having a combined slide formed of partial slides and movable in the X direction on two linear guides by guide carriages. The two partial slides are supported directly relative to one another by support guides and can be moved in the X direction relative to one another in order to carry out a correcting adjustment or a feed movement. Each partial slide supports a vertical spindle movable in the Z direction. A joint multiple turret is associated with the vertical spindles and is provided with tools associated with the two tool spindles. The vertical spindles and the partial slides have separate drives that can be controlled by a controller such that the vertical spindles and the partial slides are displaceable jointly and synchronously or relative to one another in order to carry out a correcting adjustment or a feed movement. Due to the relative displacement of the partial slides in the X direction and the vertical spindles in the Z direction, tolerances and deviations due to wear of the cutting edges can be compensated for so that the workpieces to be machined simultaneously have the same adjustment with respect to the tool cutting edges. The relative displacement also permits a separate, varying machining of the workpieces.

OBJECTS OF THE INVENTION

It is therefore an object of the present invention to provide an improved machining apparatus, particular a dual-spindle one.

Another object is the provision of such an improved dual-spindle machining apparatus, that is more flexible and compact than the prior-art such machines.

SUMMARY OF THE INVENTION

An apparatus for machining a workpiece has according to the invention a housing having a vertical front wall and a first vertical side wall generally perpendicular thereto, respective first front and side vertical guides on the front and first side walls, and a first vertical slide extending along the front and first side walls. First front and side formations on the first vertical slide engage the first front and side guides for vertical movement of the first vertical slide relative to the housing. A first spindle unit adapted to hold the workpiece is carried on the first vertical slide, and a tool holder adapted to hold tools in a first work station is provided below the first vertical slide so that the spindle unit can engage the workpiece with a one of the tools in the work station.

Thus the slide is very stably mounted, yet hugs the machine housing so that the apparatus is very compact, while at the same time very accurately positioning the workpieces.

Further according to the invention the housing has a second side wall parallel to the first side wall. The apparatus further has according to the invention respective second front and side vertical guides on the front and second side walls and a second vertical slide extending along the front and second side walls. In addition, second front and side formations on the second vertical slide engage the second front and side guides for vertical movement of the second vertical slide relative to the housing, while a second spindle unit adapted to hold the workpiece is carried on the second vertical slide. The tool holder also is adapted to hold tools in a second work station below the second vertical slide and horizontally offset from the first work station. Thus two workpieces can be machined simultaneously.

The first and second vertical slides according to the invention are seen from above both of T-shape with a leg extending along the respective side wall and carrying the respective side formation and an arm extending along the front wall and carrying the respective front formation. In addition first and second horizontal guides are provided on the arms of the first and second slides. The first and second spindle units are horizontally shiftable on the horizontal guides of the respective slides between a working position above the respective working station and a transfer position above a transfer station offset outwardly away from the respective working station. Each of the arms extends fully from the respective working position to the respective transfer position.

The apparatus further has according to the invention respective first and second conveyors for conveying the workpieces into and out of the transfer stations. Furthermore, a device can be provided for moving workpieces from one of the conveyors to the other of the conveyors behind the housing. Thus the workpieces can be subjected to multiple machining operations in the apparatus.

The tool holder according to the invention is carried on the housing. More particularly, it is rotatable on the housing about a horizontal axis for movement of the tools through the first working station. In a particularly efficient embodiment, the tool holders carries two first tools and two second tools and is movable between a position with each of the first tools in a respective one of the working stations and a position with each of the second tools in a respective one of the working stations. Thus not only can a two workpieces be machined at the same time, but can be machined by two different tools without moving from the work station it is in. If a transfer device is provided, the workpiece can be subjected to four different machining operations in the apparatus.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
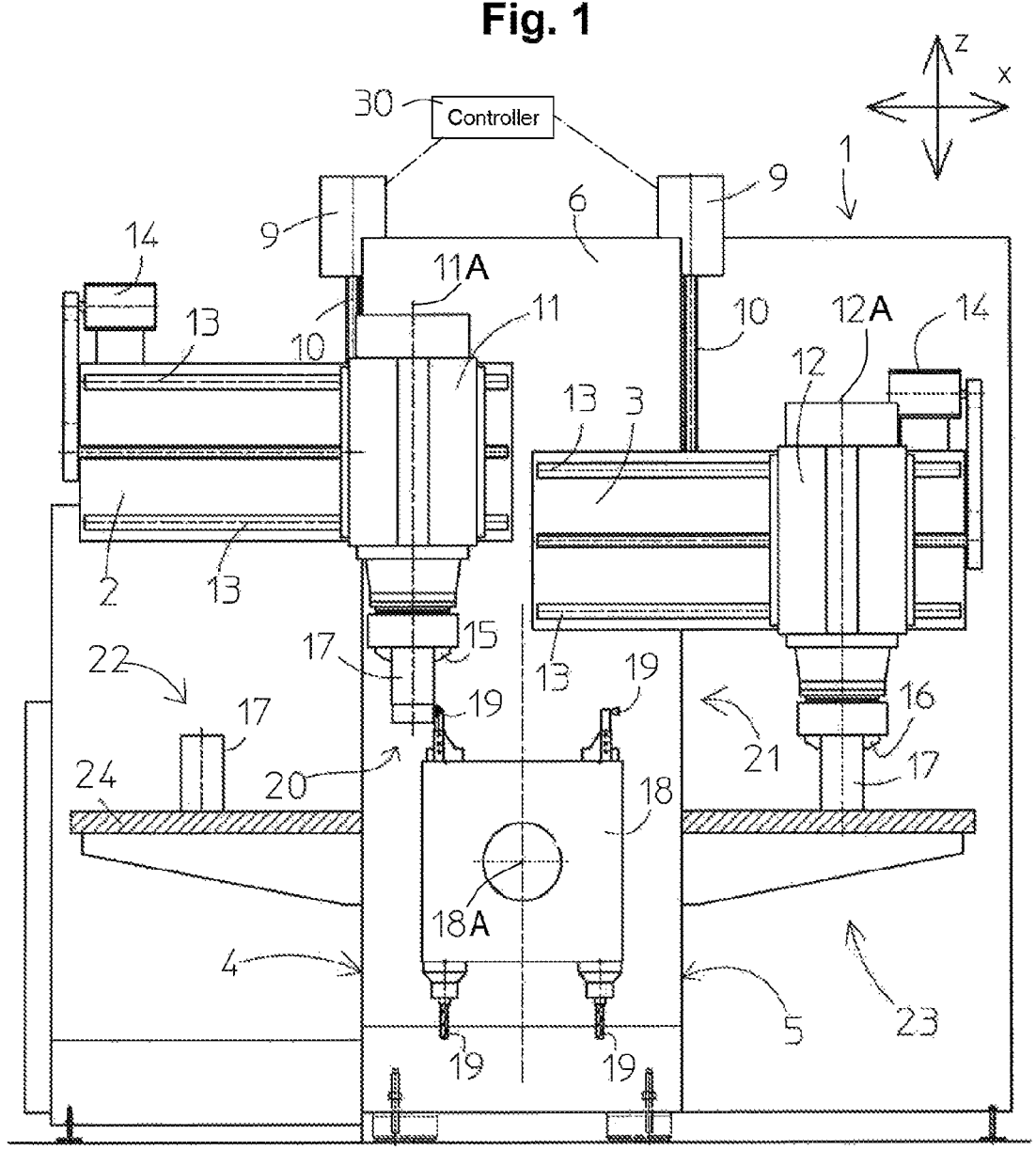
FIG. 1 is a front elevational view of the apparatus according to the invention.
Figure 2:
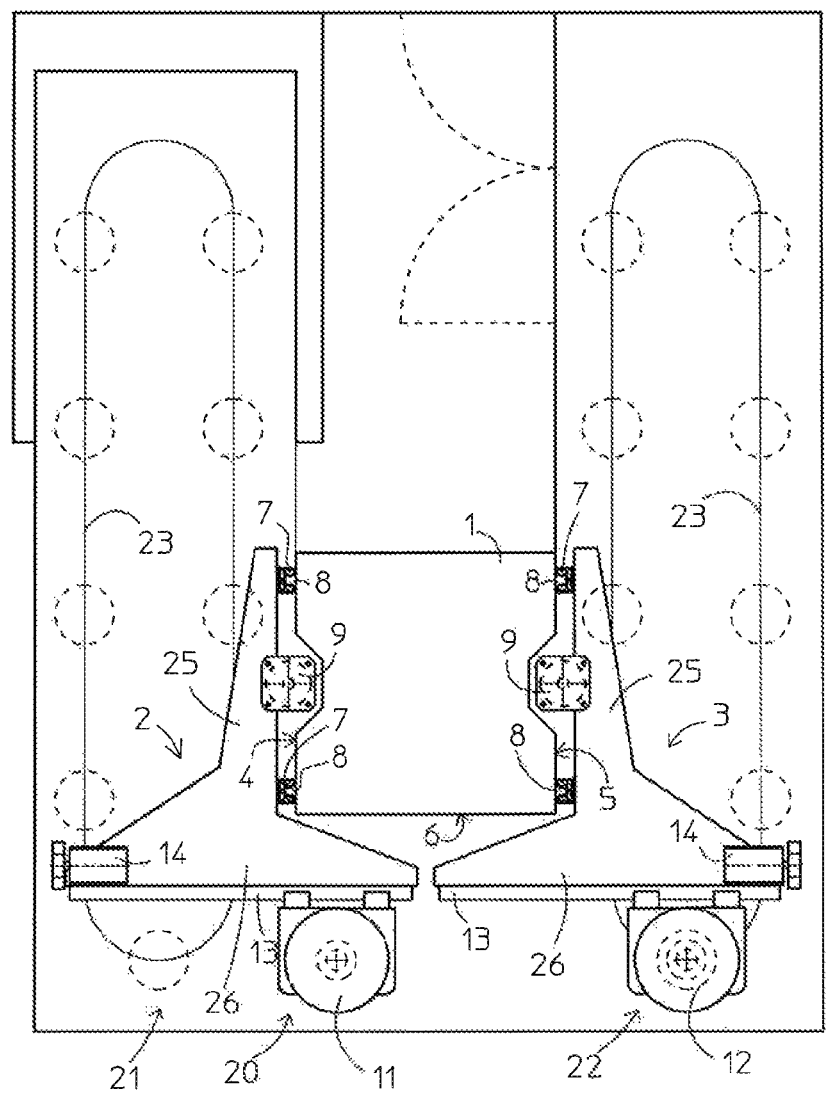
FIG. 2 is a top view of the apparatus.

As seen in FIGS. 1 and 2 a double-spindle machining apparatus according to the invention has a housing 1 with two parallel, planar, and vertical side walls 4 and 5 bridged by a planar and vertical front wall 6. Respective vertical slides 2 and 3 generally of T-shape seen from above each have a center leg 25 carrying shoes 7 that ride on vertical rails 8 carried on the side walls 4 and 5 for vertical movement in direction z. Respective motors 9 carried on the frame 1 are connected by threaded spindles 10 to the slides 2 and 3 and to a common controller 30.

Figure 3:
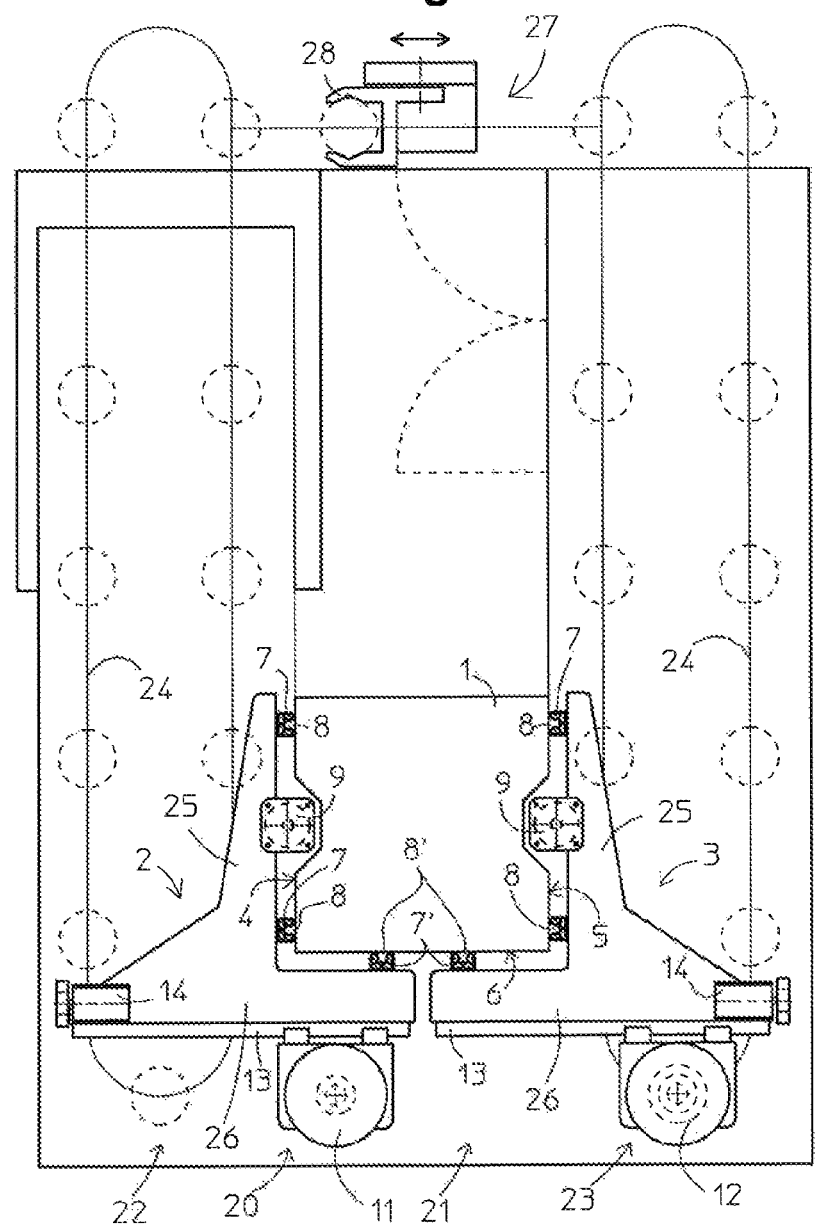
FIG. 3 is a view like FIG. 1 of an alternative apparatus according to the invention.

FIG. 2 shows that the slides 2 and 3 are supported only by the shoes 7 on the respective side walls 4 and 5. FIG. 3 shows another shoe 7' and rail 8' between the front arm 26 of the T-shaped slides 2 and 3 and the front wall 6, providing additional rigidity and stability.

The slides 2 and 3 are each provided with a pair of horizontal rails 13 extending parallel to the front wall 6 and carrying respective drive/spindle units 11 and 12 centered on respective vertical axes 11A and 12A. Respective drives 14 operated by the controller 30 can shift the spindle units 11 and 12 on the respective slides 2 and 3 in horizontal direction z. Each of the spindle units 11 and 13 carries a respective holder or chuck 15 and 16 adapted to hold a workpiece 17 to be machined and rotate it about the respective axis 11A and 12A.

A rectangular tool holder 18 is pivotal by an unillustrated drive about a horizontal axis 18A extending perpendicular to the front wall 6, parallel to and equidistant between the side walls 4 and 5, and centered between the corners of the holder 18. A respective tool 19 is mounted on each of the corners of the holder 18. The tools 19 can be positioned in work stations 20 and 21 each positioned forward of the front wall 6 and slightly inward of the respective side wall 4 or 5. The tools 19 can be simple cutters that are held stationary while a rotating workpiece 17 is pressed against them, or rotationally driven bits also intended for some form of chip-removing machining.

The apparatus is provided outside each of the side walls 4 and 5 with a conveyor 24 capable of moving the workpieces 17 one after another into and out of transfer stations 22 and 23 that are positioned forward of the plane of the front wall 6 and slightly outward of the respective side wall 4 or 5. The stations 20-23 are level with one another in a horizontal row extending parallel to the front wall 6.

FIG. 3 shows a device 27 mounted at the back of the housing 1 and equipped with a grab 28 and capable of moving workpieces 17 from one conveyor to the other and also to inverting the workpieces 17 if both ends are to be machined.

I claim:

1. An apparatus for machining a workpiece, the apparatus comprising:
   a housing having a vertical front wall and a first vertical side wall generally perpendicular thereto;
   respective first front and side vertical guides on the front and first side walls;
   a first vertical slide extending along the front and first side walls;
   first front and side formations on the first vertical slide engaging the first front and side guides for vertical movement of the first vertical slide relative to the housing;
   a first spindle unit adapted to hold the workpiece and carried on the first vertical slide;
   a tool holder adapted to hold tools in a first work station below the first vertical slide, whereby the spindle unit can engage the workpiece with a one of the tools in the work station.

2. The machining apparatus defined in claim 1, wherein the housing has a second side wall parallel to the first side wall, the apparatus further comprising:
   respective second front and side vertical guides on the front and second side walls;
   a second vertical slide extending along the front and second side walls;
   second front and side formations on the second vertical slide engaging the second front and side guides for vertical movement of the second vertical slide relative to the housing; and
   a second spindle unit adapted to hold the workpiece and carried on the second vertical slide, the tool holder also being adapted to hold tools in a second work station below the second vertical slide and horizontally offset from the first work station.

3. The machining apparatus defined in claim 2, wherein the first and second vertical slides are seen from above both of T-shape with a leg extending along the respective side wall and carrying the respective side formation and an arm extending along the front wall and carrying the respective front formation.

4. The machining apparatus defined in claim 3, further comprising:
   first and second horizontal guides on the arms of the first and second slides, the first and second spindle units being horizontally shiftable on the horizontal guides of the respective slides between a working position above the respective working station and a transfer position above a transfer station offset outwardly away from the respective working station.

5. The machining apparatus defined in claim 4, wherein each of the arms extends fully from the respective working position to the respective transfer position.

6. The machining apparatus defined in claim 4, further comprising respective first and second conveyors for conveying the workpieces into and out of the transfer stations.

7. The machining apparatus defined in claim 6, further comprising:
   means for moving workpieces from one of the conveyors to the other of the conveyors behind the housing.

8. The machining apparatus defined in claim 1, wherein the tool holder is carried on the housing.

9. The machining apparatus defined in claim 8, wherein the tool holder is rotatable on the housing about a horizontal axis for movement of the tools through the first working station.

10. The machining apparatus defined in claim 9, wherein the tool holders carries two first tools and two second tools and is movable between a position with each of the first tools in a respective one of the working stations and a position with each of the second tools in a respective one of the working stations.

11. The machining apparatus defined in claim 1, further comprising:

a conveyor for displacing the workpieces into and out of the transfer station.

\* \* \* \* \*